Figure 1:
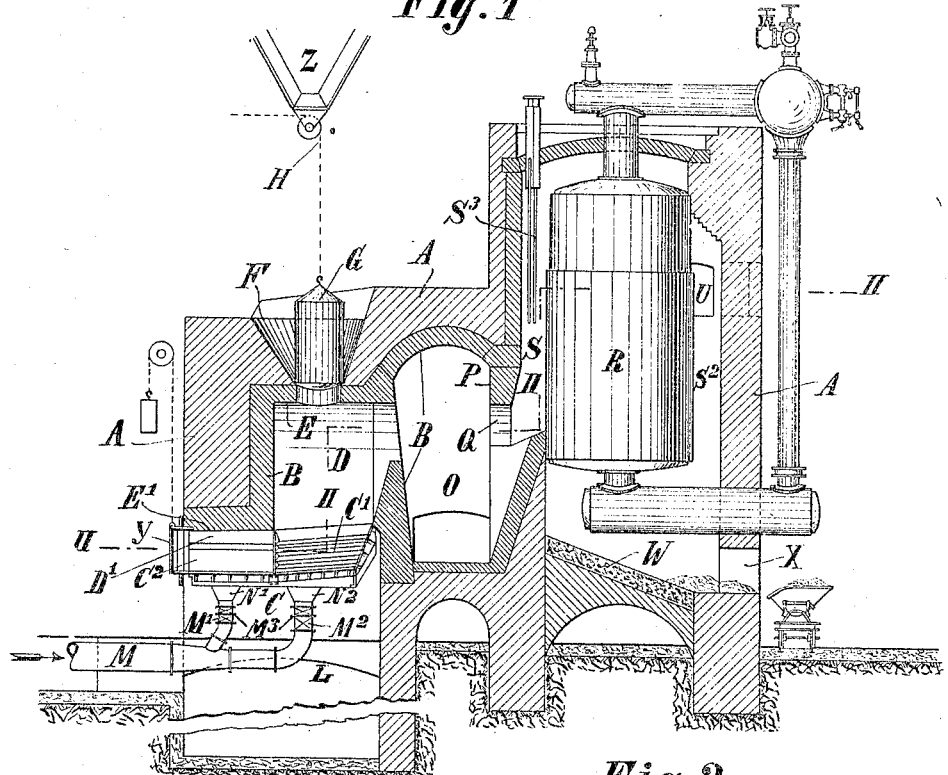

J. A. FRIED.
FURNACE FOR BURNING REFUSE.
APPLICATION FILED FEB. 19, 1909.

1,002,575.

Patented Sept. 5, 1911.

2 SHEETS—SHEET 1.

Witnesses:

Inventor:

J. A. FRIED.
FURNACE FOR BURNING REFUSE.
APPLICATION FILED FEB. 19, 1909.

1,002,575.

Patented Sept. 5, 1911.

2 SHEETS—SHEET 2.

WITNESSES

INVENTOR

UNITED STATES PATENT OFFICE.

JOHANN ALOYS FRIED, OF BARMEN, GERMANY, ASSIGNOR, BY DIRECT AND MESNE ASSIGNMENTS, OF TWO-THIRDS TO MAX BOUCHSEIN, OF NEW YORK, N. Y.

FURNACE FOR BURNING REFUSE.

1,002,575.     Specification of Letters Patent.     Patented Sept. 5, 1911.

Application filed February 19, 1909. Serial No. 478,949.

*To all whom it may concern:*

Be it known that I, JOHANN ALOYS FRIED, a citizen of the German Empire, residing at Barmen, in the Province of Rhenish Prussia, Prussia, Germany, have invented certain new and useful Improvements in Furnaces for Burning Refuse; and I do hereby declare the following to be a full, clear, and exact description of the invention, such as will enable others skilled in the art to which it appertains to make and use the same.

This invention relates to an apparatus for burning house and street refuse and similar materials including culm or coal refuse or other low grade fuel or refuse of inferior heat producing quality, which however still contains so much carbon and combustible matter that under proper treatment and in properly constructed furnaces they are capable of being burned, even without the addition of coal or proper fuel, and if so treated, instead of being a nuisance and burden may be turned to useful purposes, as for heating steam boilers or such like heating purposes, while the ashes formed thereby may constitute a valuable building material for making concrete in place of sand or mortar.

The house and street refuse, in the following for simplicity's sake called "dust" as it comes from the kitchens and is gathered on the roads, thus containing vegetable and other kitchen offal, cinders, ashes, tin boxes, broken glass, earthenware, paper bits, straw and other waste from factories and so on, without being cleaned, dried or separated in any way is thrown in large quantities, say 400 to 600 kilograms, at a time in a furnace in which the fuel, contained in the dust is burned absolutely and the heating gases produced are free from fine ashes carried by the same after they have given off the heat contained in them without being able to form injurious deposits on the heat transmitting surfaces of the steam generator, so that the ashes which in boilers and other furnaces hitherto were considered as a nuisance by the apparatus of the applicant are even turned to useful effect. The dust is thrown on the grate which is preferably of special trough-shape design where it is burned and gasified by the use of heated fresh air (primary air); it is then drawn forward on a grate forming as one may say, the front part of the trough shaped grate and here the heat contained in these slags and cinders is utilized to heat to a very high degree another part of fresh air, which at the same time cools down these heated slags, and which is blown into the carbonous oxid gases produced on the hind part (trough) of the grate, there mixing and burning with these gases to carbonic acid in a mixing chamber above the trough-shaped grate and producing the highest degree of heat. Now it is a known fact that above 1000° C. carbonic acid is again decomposed into carbon and oxygen and therefore the addition of secondary heated air is necessary, from thence the hot gases together with the fine ashes (flying ashes) carried off by them are carried around a vertical tubular boiler upward and then through the flue tubes in the same downward so that the heat contained in the ashes is also utilized and the ashes are then deposited on a sloping floor underneath the boiler from which floor they can be drawn off through a door in the front wall of the boiler brickwork, whereas the cooled and inert gases flow off through a separate flue into the chimney.

The furnace used for carrying out the above is shown in the accompanying drawings, in which—

Figure 2:
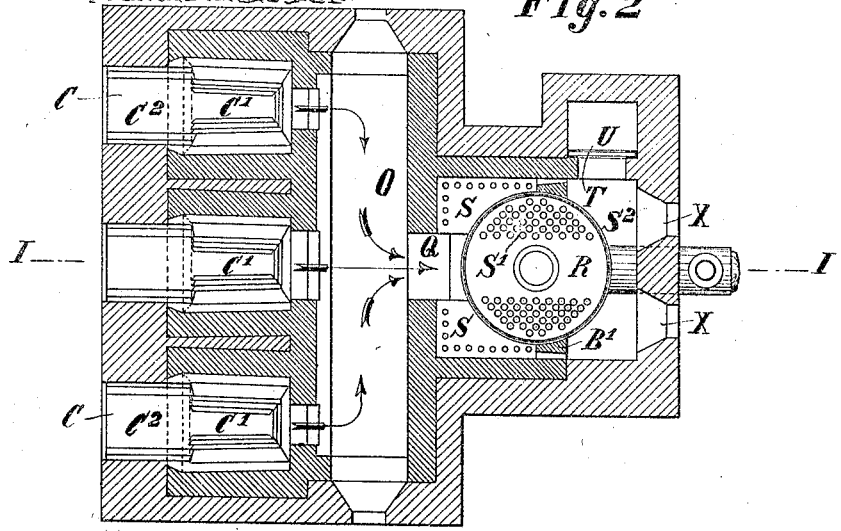
Figure 3:
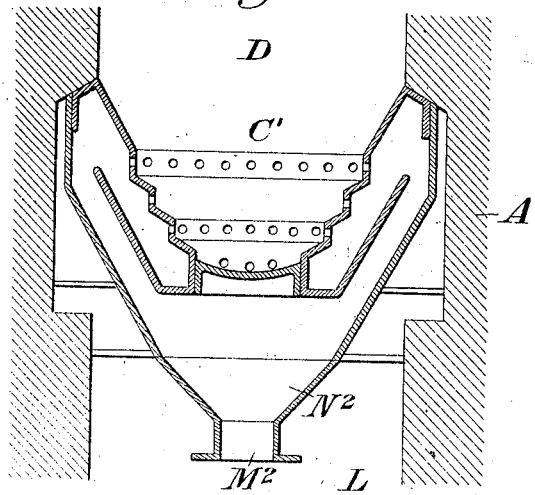
Figure 4:
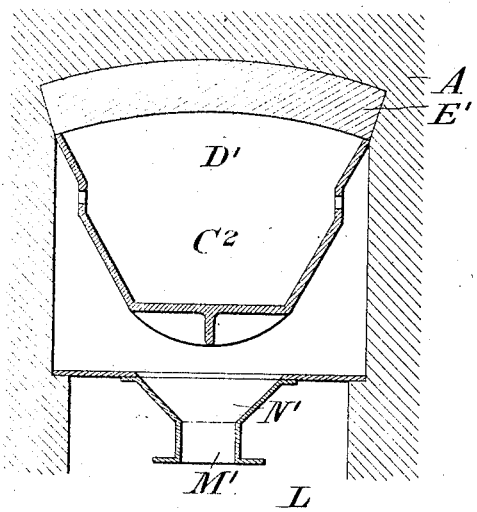

Figure 1 is a vertical section on the line I—I of Fig. 2 and Fig. 2 is a horizontal section on the broken line II—II—II of Fig. 1. Fig. 3 is a cross section of one of the main grates; and Fig. 4 is a cross section of one of the fore-grates.

This furnace is also specially constructed with a view of being able to carry out repairs of the grate or replace one grate for another without being compelled to stop the whole operation or the furnaces adjacent to the defective one and for this purpose the grate is so arranged that it can be taken out of its place as a whole or only parts of it by being suspended on a pulley block going down through the feeding funnel and left down into a special pit or channel below the grate, where the defective pieces can be repaired or replaced by new ones without the operation being stopped or the laborers being hindered by the heat of the adjacent furnaces or hindering themselves, the stoking and firing going on in the other furnaces. If found necessary this channel may be cooled by fresh air blown into the same by a fan or blower. This is of great importance because by these means the work can be carried on without interruption and the accumulation of large masses of dust which are gathered daily in a city of only medium size is avoided; the transportation of heavy pieces (a grate of medium size for the new furnace weighs about 1900 or 2000 kilograms) is avoided or it can be carried out so easily by the use of pulley blocks by which the grate can be suspended that two men can carry it out conveniently. This is of great importance considering that repairs in a dust burning furnace are much oftener necessary than an ordinary fire place on account of the exceedingly varying circumstances under which the dust furnace is worked and the great temperatures which are produced therein.

A indicates the brickwork of the furnace proper and of the boiler; B is the inner lining of the wall of refractory bricks. The furnace shown has three grades C placed side by side. More or less may be arranged, depending on the quantity of dust which has to be burned per day. Each grate is composed of two distinct parts, namely the part $C^1$ of trough shape and the front part $C^2$ consisting of a flat grate surface. On to this grate, part of the fuel may roll and is burned there. Immediately above the part $C^1$ is a filling, burning, collecting and mixing space D, which is covered by an arched roof E and approximately centrally above the grate $C^1$ is the filling or feeding hole F of the furnace made in the roof of the furnace. This feeding hole is funnel shaped, so as to allow large quantities of dust to be thrown into the same at a time and its bottom outlet is closed by a lid or cover in the shape of a cylinder or drum G which can be raised and lowered by means of a chain and roller gear H on which it is suspended overhead. It will be seen that when the funnel F is filled with dust it recover in the shape of a cylinder or drum G to allow the contents of the funnel to fall down freely on the hearth $C^1$ when the drum G can again be lowered and close the feed hole, and it will be understood that during the feeding operation hardly any gas can escape and hardly any cold air will enter, which might influence the temperature in the furnace sensibly. The space above the front part $C^2$ of the grate is also covered by an arched roof $E^1$, but this space $D^1$ is considerably lower than the space D above the trough $C^1$. On to the grate $C^2$ the burned out remnants of the dust from the hearth $C^1$, slags, ashes and cinders are drawn, there to be cooled by fresh air, which is blown into and through the same and which thereby is highly heated at the same time, thus utilizing profitably all the heat contained in the slags. For this purpose and also for leading fresh air to the dust on the hearth $C^1$ I arrange underneath the grate, which is of such construction as will allow air to be forced into it from the sides or bottom, instead of the usual ash pit a deep space or working room L which runs crosswise along underneath all the grates C and in which the air pipes M as well as other piping, water pipes for the water pockets of the trough grate and other requisites and measuring instruments not shown, but necessary or practical for the working of the furnace are lodged. This channel L besides this serves another very important purpose as will be explained farther on.

From the main air pipe M branch pipes $M^1$ and $M^2$ are branched off which lead the compressed air into distributing boxes $N^1$ and $N^2$ of known design from which the air is blown and evenly distributed into the dust on the hearth $C^1$ and into the slags on the grate part $C^2$. Valves $M^3$ are placed in the pipes $M^1$ and $M^2$ for regulating the draft. It will thus be understood that no ashes can fall down into the room L on account of the boxes $N^1$, $N^2$ and also that the fresh air blown through the slags or over them is highly heated on the grate part $C^2$ and burns the rest of the carbon in the slags. The fresh air above mentioned can then escape through the upper part of the space $D^1$ into the space D and through the upper part of the dust and into the free space above it where the monoxid of carbon from hearth $C^1$ is collected and will be mixed here with these gases, so that they will be burned to carbonic acid gas so that by this process the highest degree of heat is developed evenly in the center part of the dust heap on the grate so that in fact everything on the same, earthenware, tin boxes and other pieces of iron, is burned or melted to a uniform glassy mass forming large compact or half fluid lumps. These highly heated gases are carried over the spaces D of all the single furnaces into a common collecting chamber O where they are still better mixed in consequence of the different directions in which they enter therein as indicated by the arrows and—if such should be the case—the still unburned or unmixed gases are now quite intimately and finally mixed with the oxid gases. Said collecting chamber O is separated from the boiler setting space by a sort of baffle wall P at the rear side of chamber O which leaves a comparatively narrow opening Q to permit only the gases to enter in the boiler setting space. This forms a sort of pit in which the vertical tubular boiler R is so erected, that the heating gases coming from the chamber O first flow along the front half outside of the boiler shell upward in the flue S, then down in the boiler through the tubes $S^1$ in the same and finally upward again along the rear part of the boiler shell in the flue $S^2$—the flues $S$ and $S^2$ being separated by brick feathers $B^1$ between the boiler and wall—whence they escape through the door $T$ into a channel $U$ which conducts them to a chimney. In the flue $S$ steam superheating pipes $S^3$ may be arranged as indicated in the drawing.

The fine ashes carried away by the draft of gases will not adhere to the vertical sides of the boiler plates and of the tubes because these do not give any means where the ashes could rest and because these plates and sides of the tubes are always cooled by the water inside of the boiler therefore they can not burn fast on those plates; they are on the contrary deposited on the sloping bottom $W$ below the boiler and can be scraped out thence through a door $X$ into a vehicle and carried to some place of destination. The slag together with ashes from the front part $C^2$ of the grate when sufficiently cooled is drawn off in large lumps through the door $y$ in front of the furnace and is also carried away and then broken or crushed to serve as building material for making, building stones, concrete or mortar for which purpose it is especially well suited because it contains no organic matters which do not bind with cement.

When repairs have to be made or a grate has to be replaced by another, the connections of the piping with the grate are undone and also other fixing parts; the drum $G$ is put on one side and the chain and pulley blocks fixed overhead on the bracket $Z$, which also holds the chain roller $H$, are let down through the furnace and the grate fixed thereon in any suitable and convenient manner and it is then lifted out of its place and dropped down into the room $L$ where the repairs can be made as indicated above. In the same easy and convenient manner the repaired or new grate can be put again in place; no brick work need be destroyed and everything can be done in relatively convenient manner. The grate need not be drawn out in front of the furnace where it would hinder the workmen and be in the way of the laborers carrying off the slags from the adjacent furnaces and so in order to avoid these hindrances would have to be carried away to some other working place for carrying out the repairs.

From the description given and from the drawings shown it will be understood that the new furnace makes it possible to more thoroughly consume the dust, to utilize the heat produced during the burning of the dust and to make profitable use of even the slags and other remnants and also reduces the work hitherto required to consume city or other refuse, therefore being very economical and an important invention.

The grate $C^1$ which receives the refuse is called the main grate and $C^2$ is the foregrate, which forms an extension from the main grate.

On April 29, 1910, applicant filed a divisional application Serial No. 558459, in which he inserted process claims canceled from this application.

Having thus described my invention what I claim as new and desire to secure by Letters Patent is:

1. A refuse burning furnace having a main combustion chamber provided with an extension, a main grate in said chamber, a foregrate forming a continuation or extension of the main grate and located in the said extension of the main combustion chamber, the foregrate being arranged to receive the slagged material from the main grate, and means for supplying air to the foregrate, the two grates being so arranged that the heated air from the foregrate will enter the main combustion chamber above the fuel bed therein and mingle with the gases of combustion therein; substantially as described.

2. A refuse burning furnace having a main combustion chamber provided with an extension, a main grate in said chamber, a foregrate forming a continuation or extension of the main grate and located in the said extension of the main combustion chamber, the foregrate being arranged to receive the slagged material from the main grate, and means for supplying a regulated amount of air to both grates, the two grates being so arranged that the heated air from the foregrate will enter the main combustion chamber above the fuel bed therein and mingle with the gases of combustion therein; substantially as described.

3. A refuse burning furnace having a main combustion chamber provided with an extension, a main grate in said chamber, said grate being trough-shaped and having a plurality of openings in its sides, a foregrate forming a continuation or extension of the main grate and located in a chamber forming an extension of the main combustion chamber, the foregrate being arranged to receive the slagged material from the main grate, and means for supplying air to the foregrate, the two grates being so arranged that the heated air from the foregrate will enter the main combustion chamber above the fuel bed therein and mingle with the gases of combustion therein, substantially as described.

4. A refuse burning furnace having a main combustion chamber provided with an extension, a main grate in said chamber, said grate being trough-shaped with terraced sides having inwardly directed air openings at different levels, a foregrate forming a continuation or extension of the main grate and located in the said extension of the main combustion chamber which opens into said main chamber, the foregrate being arranged to receive the slagged material from the main grate, and means for supplying air to the foregrate, the two grates being so arranged that the heated air from the foregrate will enter the main combustion chamber above the fuel bed therein and mingle with the gases of combustion therein, substantially as described.

5. A refuse burner having a plurality of cells or chambers, each chamber having a trough-shaped main grate with air holes in the side thereof and a feeding hole through which the refuse is fed, each chamber also having an extension containing a fore-grate upon which the slagged material may be drawn from the main grate, the fore grate having an air chamber with outlets, connections for supplying air under pressure to both grates, and a combustion passage or chamber having ports leading from the several cells or combustion chambers; substantially as described.

6. A refuse burning furnace having a main combustion chamber provided with an extension, a main grate in said chamber, a foregrate forming a continuation or extension of the main grate and located in the said extension of the main combustion chamber which extension opens into said chamber, the foregrate being arranged to receive the slagged material from the main grate, means for supplying air to the foregrate, the two grates being so arranged that the heated air from the fore grate will enter the main combustion chamber above the fuel bed therein and mingle with the gases of combustion therein, together with a boiler, and means for conducting the gases from the main combustion chamber into heating contact with the boiler, substantially as described.

7. A refuse burner having a series of cells or chambers, each chamber having a main grate of trough-shape with side air openings and also having an extension, a feeding hole through which the refuse is fed, and a fore grate in said extension and upon which the slagged material may be drawn from the main grate, each fore grate being arranged to heat the air supplied to the material on the main grate, a combustion chamber or passage to which ports lead from said cells or combustion chambers, and a steam boiler in the path of the gases from the several grates; substantially as described.

8. A refuse burning furnace having a plurality of combustion cells or chambers, each having a main grate and an extension containing a fore grate, means whereby refuse may be deposited on each main grate, each fore grate being arranged to receive the slagged material from its main grate, a separate air chamber for each fore grate and each main grate, each of the grates having openings in communication with one of the air chambers, means to supply air under pressure to each of the air chambers, separate means for controlling the supply of air to each air chamber, the air from the foregrate air chambers being heated by contacting with the slagged material on the fore grates and then passing to the material on its respective main grate, and a common combustion chamber or passage arranged to receive the products from the cells; substantially as described.

In testimony whereof, I have signed my name to this specification in the presence of two subscribing witnesses.

J. ALOYS FRIED. [L. S.]

Witnesses:
 OTTO KÖNIG,
 OTTO SCHUMACHER.